United States Patent
Doughty et al.

(10) Patent No.: US 8,373,352 B2
(45) Date of Patent: Feb. 12, 2013

(54) ELECTRODELESS PLASMA LAMP ARRAY

(75) Inventors: Douglas A. Doughty, Gilroy, CA (US); Mehran Matloubian, Encino, CA (US); Frederick M. Espiau, Topanga, CA (US)

(73) Assignee: Topanga Technologies, Inc., Canoga Park, CA (US)

( * ) Notice: Subject to any disclaimer, the term of this patent is extended or adjusted under 35 U.S.C. 154(b) by 246 days.

(21) Appl. No.: 12/814,321

(22) Filed: Jun. 11, 2010

(65) Prior Publication Data

US 2011/0204791 A1    Aug. 25, 2011

Related U.S. Application Data

(60) Provisional application No. 61/187,209, filed on Jun. 15, 2009.

(51) Int. Cl.
*H05B 41/16* (2006.01)

(52) U.S. Cl. ............ 315/248; 315/185 S; 315/312; 315/324; 315/326

(58) Field of Classification Search .......... 315/312–325, 315/185 S, 291, 209 R, 247, 248
See application file for complete search history.

(56) References Cited

U.S. PATENT DOCUMENTS

| | | | |
|---|---|---|---|
| 5,019,750 A * | 5/1991 | Godyak | 315/248 |
| 5,834,895 A | 11/1998 | Dolan et al. | |
| 6,737,809 B2 | 5/2004 | Espiau et al. | |
| 7,291,985 B2 | 11/2007 | Espiau et al. | |
| 7,362,056 B2 | 4/2008 | Espiau et al. | |
| 7,477,023 B2 * | 1/2009 | Shimura et al. | 315/282 |
| 7,701,151 B2 * | 4/2010 | Petrucci et al. | 315/309 |
| 7,830,100 B2 * | 11/2010 | Mi et al. | 315/291 |
| 8,104,917 B2 * | 1/2012 | Link | 362/217.01 |
| 2006/0284569 A1 * | 12/2006 | Wey et al. | 315/282 |
| 2007/0146126 A1 * | 6/2007 | Wang | 340/517 |
| 2008/0054813 A1 | 3/2008 | Espiau et al. | |
| 2009/0322240 A1 | 12/2009 | Espiau et al. | |
| 2011/0163690 A1 * | 7/2011 | Flandre et al. | 315/294 |

OTHER PUBLICATIONS

Bogaerts, et al., "Gas Discharge Plasmas and their Applications," Spectrochimica Acta, Part B 57, 2002, pp. 609-658.
International Search Report and Written Opinion of PCT Application No. PCT/US2009/048174, dated Aug. 17, 2009, 17 pages total.

* cited by examiner

*Primary Examiner* — Tuyet Thi Vo
(74) *Attorney, Agent, or Firm* — Kilpatrick Townsend & Stockton LLP

(57) ABSTRACT

An electrodeless plasma lamp array structure uses multiple plasma lamps to produce large amounts of electromagnetic radiation (visible, IR, UV, or a combination of visible, IR, and UV). An M by N array configuration is powered by either a single RF power source or multiple RF power sources. The array incorporates controllers to adjust the power delivered from the RF power source to each lamp within the array. By adjusting the delivered RF power, the intensity of electromagnetic radiation that is emitted from each lamp is controlled independently allowing for the creation of an array of lamps that emit electromagnetic radiation of varying intensity levels at different places within the array. Using lamps with different color temperatures as part of the array allows the color temperature and the color rendering index of the illumination to achieve different lighting conditions.

16 Claims, 18 Drawing Sheets

Lamp Array

ELECTRODELESS PLASMA LAMP ARRAY

CROSS-REFERENCE TO RELATED APPLICATION

The present invention claims priority to U.S. Provisional Patent Application No. 61/187,209, filed Jun. 15, 2009, which is incorporated by reference herein for all purposes.

BACKGROUND OF THE INVENTION

This invention is directed to devices and methods for generating electromagnetic radiation, including visible, ultra-violet, and infrared, with electrodeless plasma lamps. The present invention provides plasma lamps driven by a radio-frequency source without the use of electrodes inside a gas-filled vessel (bulb). More particularly the invention involves the creation of an array of electrodeless plasma lamps. Such array of electrodeless plasma lamps can be applied to applications such as stadiums, security, parking lots, military and defense, streets, large and small buildings, vehicle headlamps, aircraft landing, bridges, warehouses, UV water treatment, UV epoxy curing, semiconductor processing, annealing, heating, agriculture, architectural lighting, stage lighting, medical illumination, projectors and displays, as well as similar applications.

Plasma lamps provide extremely bright, broadband light, and are useful in applications such as general illumination, projection systems, and industrial processing. The typical plasma lamp manufactured today contains a mixture of gas and trace substances that is excited to form a plasma using a high current passed through closely-spaced electrodes. This arrangement, however, suffers from deterioration of the electrodes, and therefore a limited lifetime.

Electrodeless plasma lamps driven by microwave sources overcome problems associated with electrode deterioration and result in lamps with longer lifetimes, stable spectrums, and higher efficiencies. Conventional configurations include a plasma fill encased either in a bulb or a sealed recess within a dielectric body forming a waveguide, with microwave energy being provided by a source such as a solid-state power amplifier or a magnetron and introduced into the waveguide and heating the plasma resistively. Other examples are provided by U.S. Patent Application No. 20090322240A1 and U.S. Pat. Nos. 7,291,985, 7,362,056, and 6,737,809, each of which are incorporated by reference herein. To achieve higher electromagnetic radiation output from the electrodeless plasma lamps (higher lumens for example), larger bulbs and higher power RF sources are desirable. While microwave sources such magnetron are available with RF powers exceeding 1000 W in a compact form factor, magnetrons do not have the reliability of solid-state power amplifiers. Although it may be possible to achieve higher RF output power from solid-state power amplifiers by combining a number of them, it can result in RF losses through the combiner and impact the overall efficiency of the RF source. Using power amplifiers at lower frequency of operation can improve the efficiency of the power amplifier. Use of a larger bulb also improves coupling RF energy to the bulb at lower operating frequencies, but it is difficult to optimize the performance of the system for best efficiency of the power amplifier and optimum coupling to the bulb. Furthermore in some applications it is difficult, if not impossible, to achieve uniform electromagnetic distribution from a large single bulb. Furthermore the power supplies required for some high lumens/electromagnetic radiation applications are bulky and inefficient. Also in some applications it is desirable to have the ability to change the lighting conditions (color temperature, CRI, distribution, etc.).

From above, it is seen that techniques for improved lighting are highly desired.

BRIEF SUMMARY OF THE INVENTION

The present invention provides devices and methods for generating electromagnetic radiation, including visible, ultra-violet, and infrared, with electrodeless plasma lamps. More particularly, this invention provides for an array of electrodeless plasma lamps driven by radio-frequency source(s) without the use of electrodes and related methods. Such an array of electrodeless plasma lamps can be useful for applications such as stadiums, security, parking lots, military/defense, streets, large and small buildings, bridges, warehouses, agriculture, UV water treatment, UV epoxy curing, semiconductor processing, annealing, heating, architectural lighting, stage lighting, medical illumination, projectors and displays, etc.

In a specific embodiment, the present invention provides an array useful for large scale thermal and/or lighting applications and/or electromagnetic radiation in various fields. In a specific embodiment of the present invention, an array of electrodeless plasma lamps is provided. The array includes at least two electrodeless plasma lamps which are mounted onto a rigid support frame. The plasma lamps can either be powered by individual RF sources or a single RF source. A controller adjusts the RF power delivered to each individual lamp in the array, thereby allowing for the control of the intensity and distribution of the output electromagnetic radiation. The lamps in the array can have bulbs with different color temperatures (for example, 3000K and 6000K). By varying the RF power delivered to each lamp in the array one can vary the overall color temperature and color rendering index of the distributed light over a surface. In a general lighting application, for example, one will have the capability to change the color temperature of the surrounding light from a warm color temperature of 3000K to a cool color temperature of 6000K.

The overall efficiency of such a system can be improved by selecting two lamps that have higher efficiencies and combining their spectrums, than using a single bulb with the desired spectrum. In horticulture applications during the life cycle of plants, different color temperature lights are desired. The ability to tune the color temperature of the light source allows optimization of plant growth. In other embodiments, the controller can be configured to control more than two lamps, a block of lamps, or the entire array of lamps, separately, together, or in any combination. In other embodiments, the RF source for each lamp is controlled by a microcontroller, with RF power detectors and/or photodetectors adjusting the RF power to the lamp to achieve the desired lighting conditions. The microcontrollers in the array can be controlled by a single controller or alternatively can be connected to each other directly through a daisy chain connection, a mesh connection, a combination, or others. The microcontrollers can communicate with each other through an RS232 interface, a USB interface, a powerline interface or through wireless, or other similar interfaces.

For industrial manufacturing applications requiring a uniform UV source, e.g. for epoxy curing applications, an array of electrodeless plasma lamps using bulbs with UV spectrum provides significant benefits. Use of individual microcontrollers to control the RF power to each lamp in the array provides control over the illumination pattern over a large surface area, and maintains a constant levels of illumination, or allows varying the illumination pattern to achieve the desired process conditions. One can also use an array of electrodeless plasma lamps with bulbs with IR spectrum for heat treatment applications used in manufacturing or semiconductor processing. Once again, with an array of electrodeless plasma lamps better process control can be achieved over a large surface area than using a single large lamp.

In another embodiment, an array of electrodeless plasma lamps with a heat exchanger is provided. The electrodeless plasma lamps are mounted onto a rigid support frame which conducts the heat generated by the lamps. A heat exchanger is disposed on the opposite side of the support frame to efficiently transfer the heat generated by the lamps.

In another embodiment, an array of electrodeless plasma lamps is coupled with an air flow assembly to provide improved heat transfer characteristics. The lamps are mounted onto a rigid support frame which conducts the heat generated by the lamps. The housing structure encompasses the support frame and the sides of the outer lamps within the array. Openings on opposing sides allow for air flow through the housing structure. If desired fans can be used to increase the flow rate.

In an alternative embodiment, an array of electrodeless plasma lamps is coupled with both a heat exchanger and an air flow system to provide further improved heat transfer characteristics. The array has at least two electrodeless plasma lamps mounted onto a rigid support frame that conducts the heat generated by the lamps. A heat exchanger is disposed on the opposing side of the support frame. A housing structure encompasses the heat exchanger, the support frame, and the sides of the outer lamps within the array. The housing contains two openings on opposing sides to allow air to flow through the housing structure. As the air flows through the housing, it not only absorbs heat from the heat exchanger, but also absorbs heat from both the support frame and the lamps, thereby effectively improving the overall heat transfer characteristics of the array.

In yet another embodiment, a movable array of electrodeless plasma lamps is provided. Specifically, the electrodeless plasma lamps are coupled to a servomotor. The servomotor/lamp assembly is then mounted onto a rigid support structure. The servomotors can be controlled and coordinated so that the array of lamps in combination, or individually, are moved to achieve the desired intensity and distribution of light (or output electromagnetic radiation).

If desired, a photodetector may be used in conjunction with the electrodeless plasma lamp array to determine the intensity of the emitted light. The photodetector enables a control system to control the RF power input level into the lamps of the array, thereby ensuring maintenance of constant intensity levels, as well as the ability to adjust the intensity and light distribution to the desired level.

In a specific embodiment, the present invention provides a method for color rendering using an electrode-less plasma lamp array apparatus. The method selectively adjusts RF power delivered to a plasma lamp apparatus from a plurality of plasma lamp apparatus in an array configuration, to adjust a color temperature for color rendering of the plurality of plasma lamps. In an alternative embodiment, the method outputs RF power selectively to at least one or more of the plasma lamp apparatus in the array configuration for color rendering the output illumination of the array.

The benefits of creating arrays of electrodeless plasma lamps for various applications include that such arrays use far less power than traditional incandescent or LED illumination arrays for the same lumens output (or light distribution). Furthermore, using electrodeless plasma lamps within an array reduces the need for electrodes carrying large amounts of power, which are more susceptible to failure. The use of electrodeless plasma lamps, within an array, leads to improved heat transfer characteristics over traditional electrode plasma lamps, as well as longer lifetime, better lumen/intensity maintenance, better uniformity, and a more stable spectrum. The present invention achieves these benefits and others using known process technology. These and other benefits are described throughout the present specification, and more particularly below.

BRIEF DESCRIPTION OF THE DRAWINGS

A more complete understanding of the present invention and its advantages will be gained from a consideration of the following description of preferred embodiments, read in conjunction with the accompanying drawings provided herein. In the figures and description, numerals indicate various features of the invention, and like numerals referring to like features throughout both the drawings and the description.

DETAILED DESCRIPTION OF THE INVENTION

This invention provides an array of electrodeless plasma lamps to generate higher intensity light (or electromagnetic radiation) distribution, or a particular light (or electromagnetic radiation) distribution, such as a uniform light distribution as well as a method to vary the color temperature and color rendering index of lighting. Such array of electrodeless plasma lamps can be applied to applications such as stadiums, security, parking lots, military and defense, streets, large and small buildings, vehicle headlamps, aircraft landing, bridges, warehouses, UV water treatment, UV epoxy curing, semiconductor processing, annealing, heating, agriculture, architectural lighting, stage lighting, medical illumination, projectors and displays, as well as similar applications.

Figure 1A:
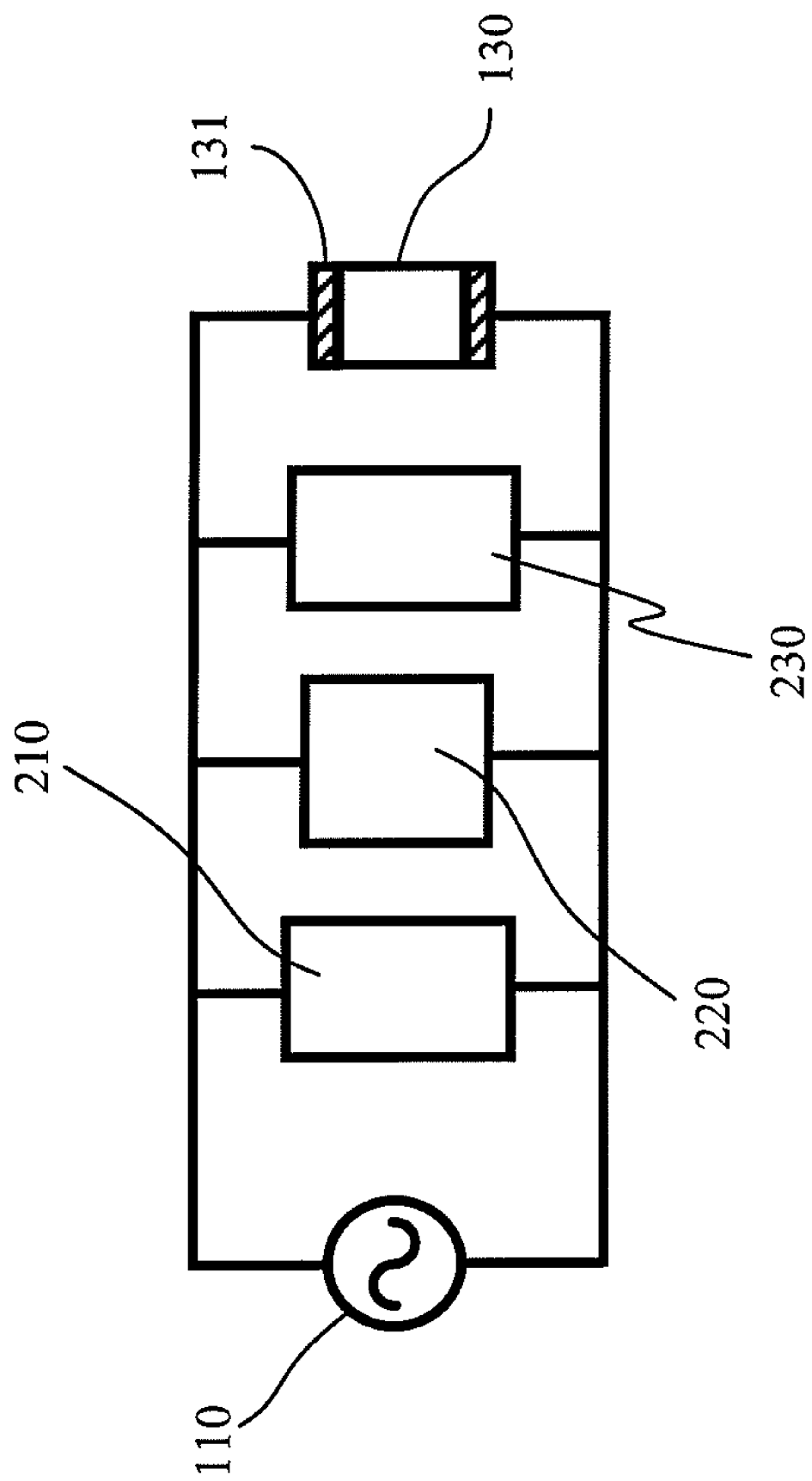
FIG. 1A is a generalized schematic of a gas-filled vessel capacitively coupled to an RF source.

FIGS. 1 and 2 illustrate electrodeless plasma lamps which can be used in the arrays of the present invention. FIG. 1A illustrates a general schematic for efficient energy transfer from RF source 110 to gas filled vessel 130. Energy from the RF source is directed to an impedance matching network 210 that enables the effective transfer of energy from the RF source to a resonating structure 220. An example of such impedance matching network is an E-field or H-field coupling element, although other types can also be used. Another impedance matching network 230, in turn, enables efficient energy transfer from the resonator to the gas filled vessel 130. An example of the impedance matching network is an E-field or H-field coupling element.

The gas-filled vessel is made of a suitable material such as quartz or other transparent or translucent material. It is filled with an inert gas such as Argon and a fluorophor or light emitter such as Mercury, Sodium, Dysprosium, Sulfur or a metal halide salt such as Indium Bromide, Scandium Bromide, or Cesium Iodide. The vessel can simultaneously contain multiple fluorophors or light emitters. The gas-filled vessel can also include a metal halide, or other metal pieces that will discharge electromagnetic radiation according to a specific embodiment. Of course, there can be other variations, modifications, and alternatives.

A capacitive coupling structure 131 is used to deliver RF energy to the gas fill within the bulb 130. As is well known, a capacitive coupler typically comprises two electrodes of finite extent enclosing a volume, thereby coupling energy primarily using at least Electric fields (E-fields). As can be appreciated by one of ordinary skill in the art, the impedance matching networks 210 and 230 and the resonating structure 220, as depicted in schematic form here, can be interpreted as equivalent-circuit models of the distributed electromagnetic coupling between the RF source and the capacitive coupling structure. The use of impedance matching networks also allows the source to have an impedance other than 50 ohms; an advantage with respect to RF source performance in the form of reduced heating or power consumption from the RF source. Lowering power consumption and losses from the RF source would enable a greater efficiency for the lamp as a whole. As can also be appreciated by one of ordinary skill in the art, the impedance matching networks 210 and 230 are not necessarily identical.

Figure 1B:
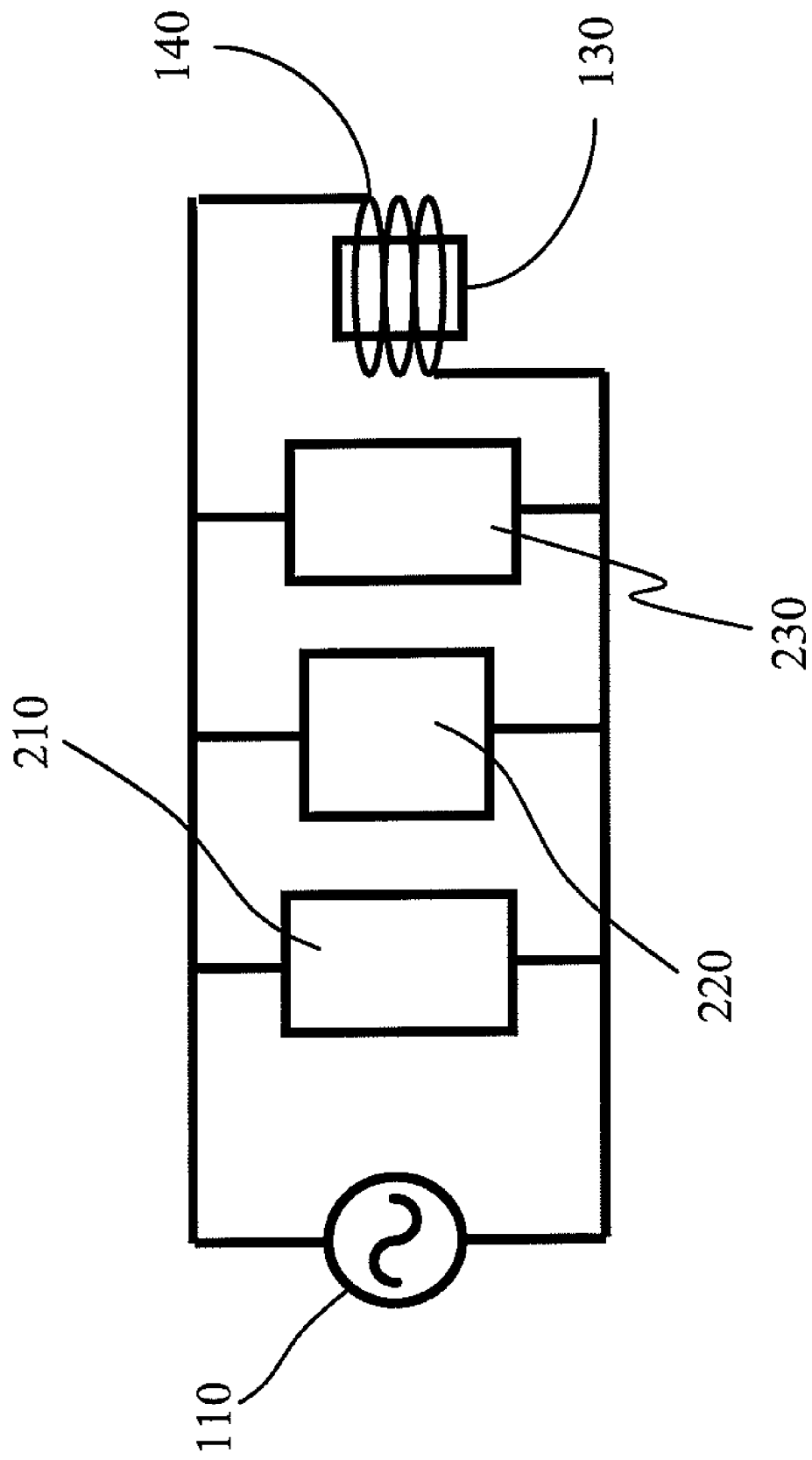
FIG. 1B is a generalized schematic of a gas-filled vessel inductively coupled to an RF source.

FIG. 1B illustrates a general schematic for efficient energy transfer from RF source 110 to gas-filled vessel 130. Energy from the RF source is directed to an impedance matching network 210 that enables the effective transfer of energy from RF source to resonating structure 220. Another impedance matching network 230, in turn, enables efficient energy transfer from resonator to gas-filled vessel 130. An inductive coupling structure 140 is used to deliver RF energy to the gas fill within the bulb 130. As is known, an inductive coupler typically comprises a wire or a coil-like wire of finite extent and couples energy primarily using magnetic fields (H-fields). The impedance matching networks 210 and 230 and the resonating structure 220, as depicted in schematic form here, can be considered as equivalent-circuit models of the distributed electromagnetic coupling between the RF source and the inductive coupling structure. The use of impedance matching networks also allows the source to have an impedance other than 50 ohm; an advantage with respect to RF source performance in the form of reduced heating or power consumption from the RF source. Lowering power consumption and losses from the RF source enable a greater efficiency for the lamp.

Figure 2A:
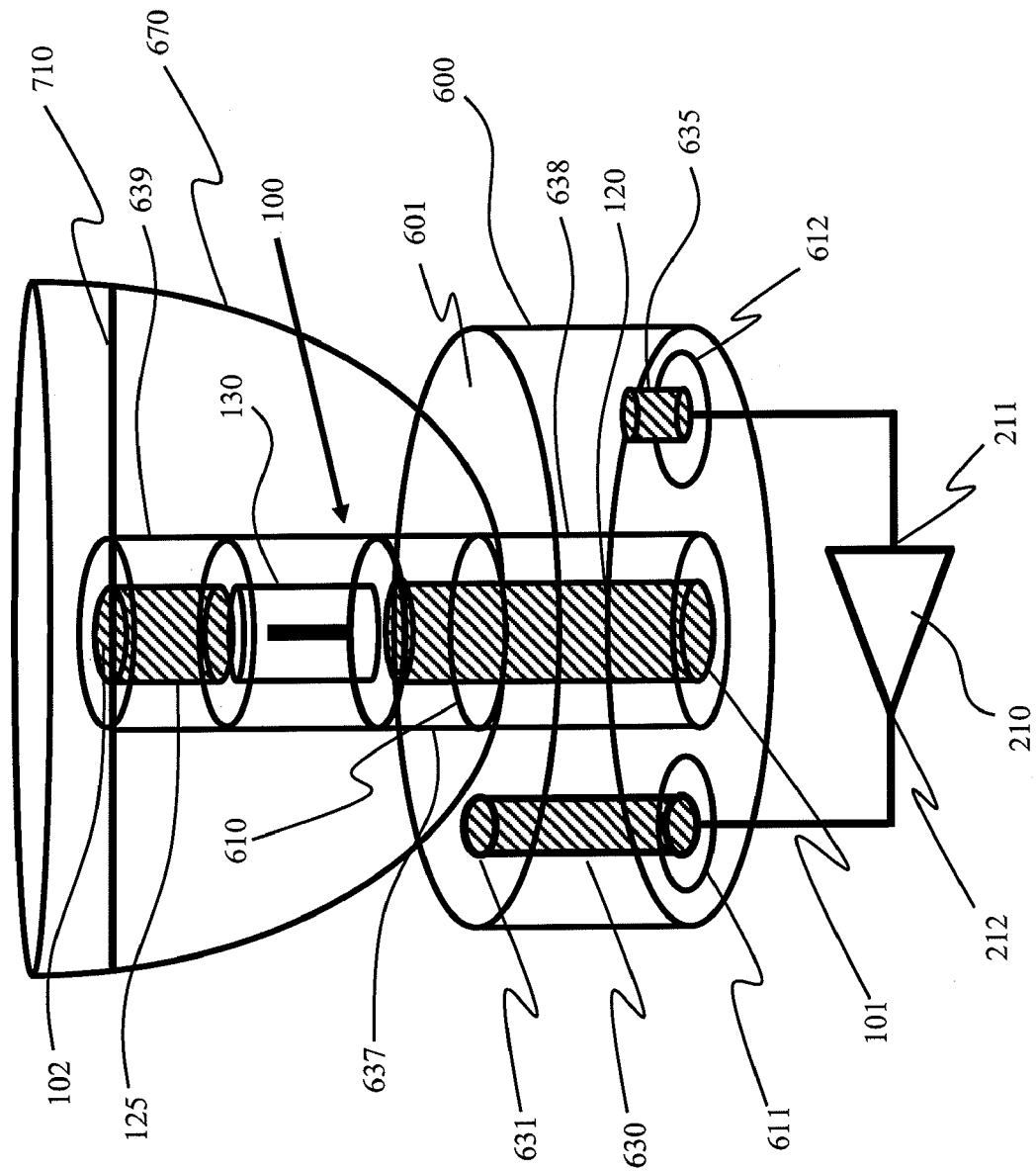
FIG. 2A is a simplified perspective view of an external resonator electrodeless lamp, including an external RF amplifier.

FIG. 2A is a perspective view of an electrodeless plasma lamp, employing a lamp body 600, whose outer surface 601 is electrically conductive and connected to ground. A cylindrical lamp body is depicted, but rectangular or other shapes may be used. This conductivity may be achieved through the application of a conductive veneer, or through the choice of a conductive material. An example of conductive veneer is silver paint, or alternatively the lamp body can be made from sheet of electrically conductive material, such as aluminum. An integrated bulb/output coupling-element assembly 100 is closely received by the lamp body 600 through opening 610. The bulb/output coupling-element assembly 100 contains the bulb 130, which is a gas-filled vessel that ultimately produces the luminous output.

The top of the assembly 100, output coupling-element 120, is grounded to the body 600 and its conductive surface 601 at plane 101. The luminous output from the bulb is collected and directed by an external reflector 670, which is either electrically conductive, or if made from a dielectric material has an electrically conductive backing, attached to and in electrical contact with, the body 600. The top of assembly 100, top coupling-element 125, is grounded to the body 600 at plane 102 via the ground strap 710 and the reflector 670. Alternatively, if there is no reflector 670, the ground strap makes direct electrical contact with the body 600. Reflector 670 is depicted as parabolic in shape with bulb 130 positioned near its focus. A wide variety of possible reflector shapes can be designed to satisfy beam-direction requirements. For example, the shapes can be conical, convex, concave, trapezoidal, pyramidal, or combinations of these, as well as other shapes. The shorter feedback E-field coupling-element 635 couples a small amount of RF energy from the bulb/output coupling-element assembly 100 and provides feedback to the RF amplifier input 211 of RF amplifier 210. Feedback coupling-element 635 is closely received by the lamp body 600 through opening 612, and as such is not in direct DC electrical contact with the conductive surface 601 of the lamp body. The input coupling-element 630 is conductively connected with RF amplifier output 212. Input coupling-element 630 is closely received by the lamp body 600 through opening 611, and as such is not in direct DC electrical contact with the conductive surface 601 of the lamp body. However, the top of the input coupling-element is grounded to the body 600 and its conductive surface 601 at plane 631.

RF power is primarily inductively coupled from the input coupling-element 630 to the bulb/output coupling-element assembly 100 through physical proximity, their relative lengths, and the relative arrangement of their ground planes. Surface 637 of bulb/output coupling-element assembly is covered with an electrically conductive veneer or an electrically conductive material and is connected to the body 600 and its conductive surface 601. The other surfaces of the bulb/output coupling element assembly including surfaces 638, 639, and 640, which are not covered with a conductive layer. Surface 640 is optically transparent or translucent. The coupling between input coupling-element 630 and output coupling-element 120 and lamp assembly 100 and lamp body 600 is found through electromagnetic simulation, and through direct measurement, to be highly frequency selective. This frequency selectivity provides for a resonant oscillator in the circuit comprising the input coupling-element 630, the bulb/output coupling-element assembly 100, the lamp body 600, the feedback coupling-element 635, and the amplifier 210. The resonant oscillator is the equivalent of the RF source 110 depicted schematically in FIG. 1A and FIG. 1B.

Figure 2B:
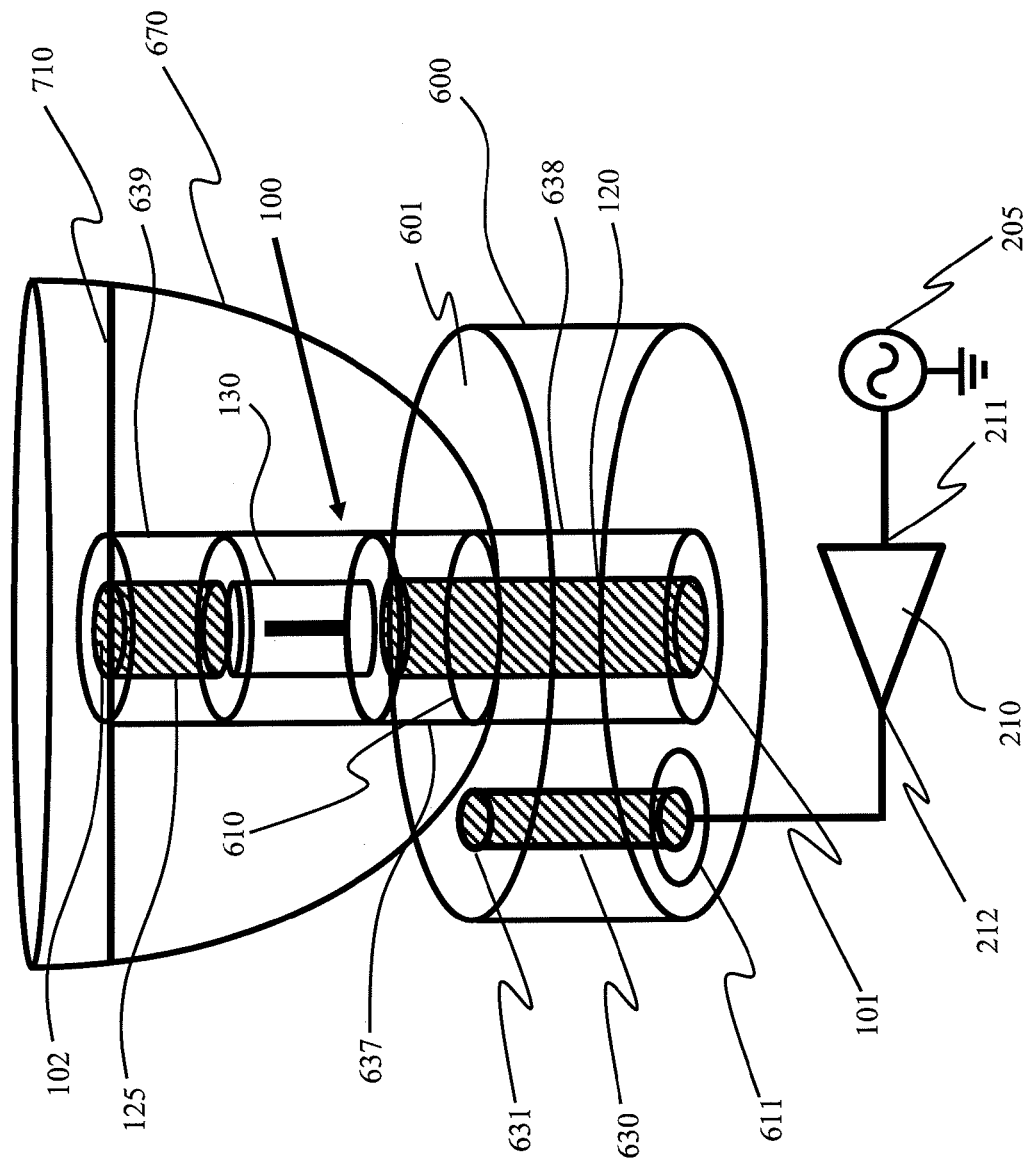
FIG. 2B is a simplified perspective view of an alternate external resonator electrodeless lamp, including an external RF source.

FIG. 2B is a perspective view of an electrodeless plasma lamp that differs from that shown in FIG. 2A only in its RF source, which is not a distributed oscillator circuit, but rather a separate oscillator 205 conductively connected with RF amplifier input 211 of the RF amplifier 210. RF amplifier output 212 is conductively connected with input coupling-element 630, which delivers RF power to the lamp/output coupling-element assembly 100. The resonant characteristics of the coupling between the input coupling-element 630 and the output coupling-element in the bulb/output coupling-element assembly 100 are frequency-matched to the RF source to optimize RF power transfer. Of course, there can be other variations, modifications, and alternatives.

Figure 2C:
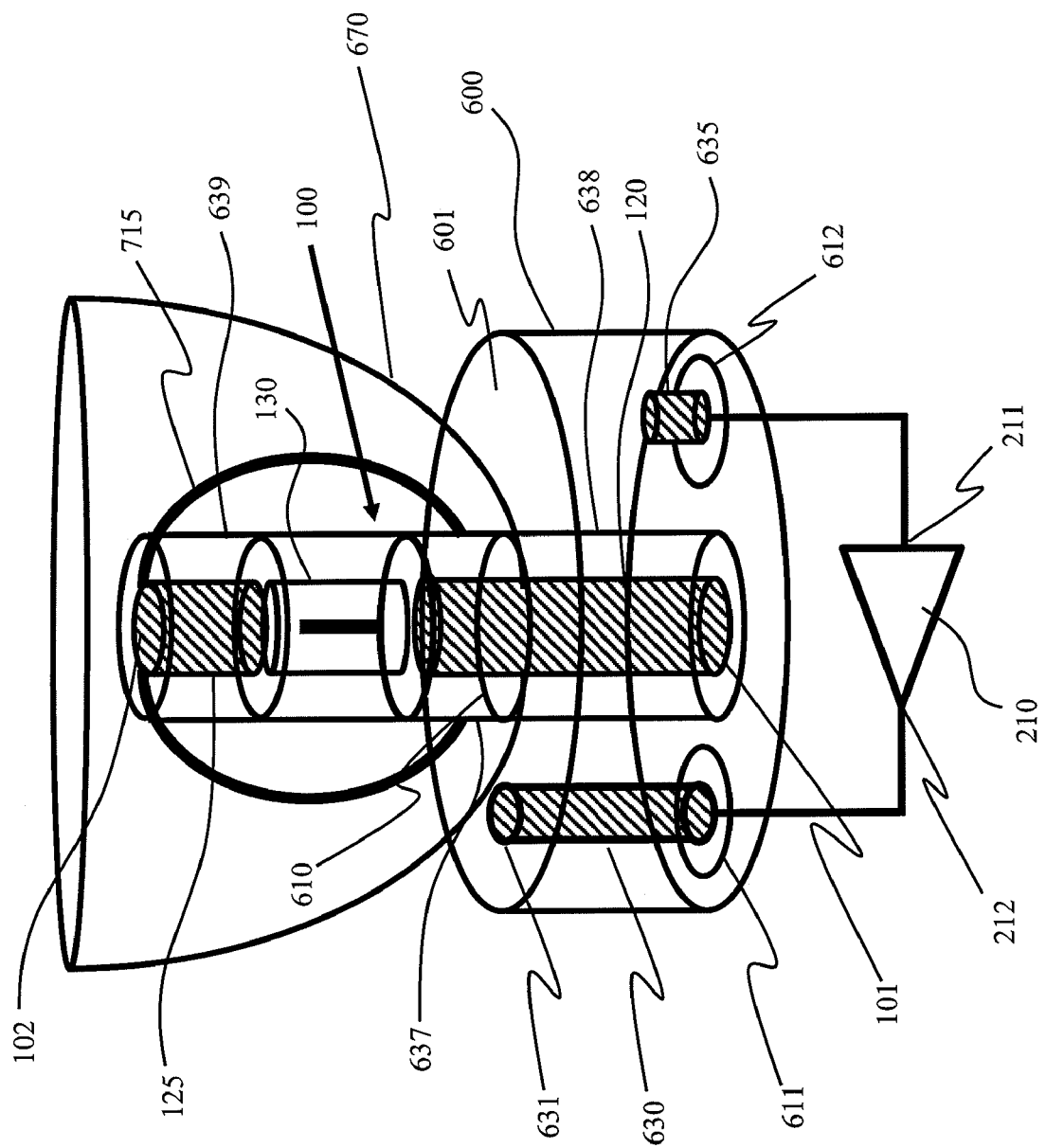
FIG. 2C is a simplified perspective view of an alternate external resonator electrodeless lamp.

FIG. 2C is a perspective view of an electrodeless lamp that is similar to the electrodeless lamp shown in FIG. 2A except that the top coupling-element 125 in the bulb assembly is directly connected to the lamp body 600 using ground straps 715.

Figure 2D:
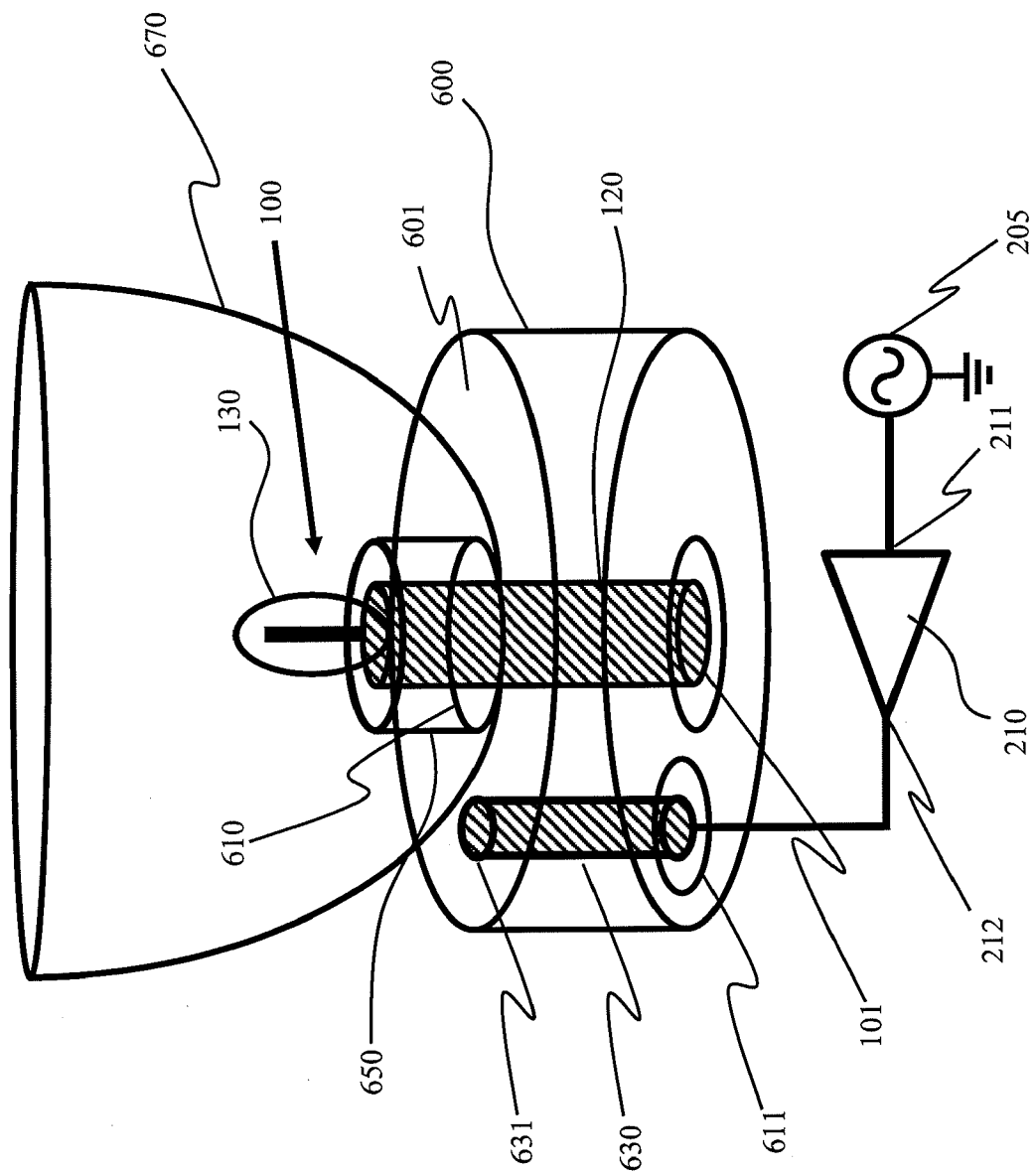
FIG. 2D is a simplified perspective view of an alternate external resonator electrodeless lamp.

FIG. 2D is a perspective view of an electrodeless plasma lamp that differs from that shown in FIG. 2B in its lamp/output coupling element assembly 100. The lamp/output coupling element assembly has a solid metal (metal post) 120 recessed at the top to receive the gas-filled vessel 130. The other end of the coupling-element is grounded to lamp body at surface 101. A thin layer of dielectric material or refractory metal such as molybdenum can be used as interface between the bulb and the metal post. Alternatively the top part of the metal post or all of the metal post can be made from a refractory metal with its outer surface covered with a layer of metal with high electrical conductivity such as silver or copper. The metal post can also be hollow inside. Examples of plasma lamp devices are described in "Electrodeless Lamps with Externally-Grounded Probes and Improved Bulb Assemblies," by Espiau, Frederick M; Brockett, Timothy J.; and Matloubian, Mehran; U.S. Patent Application Ser. No. 61/075,735, filed Jun. 25, 2008. incorporated by reference herein. Other examples include U.S. Pat. No. 7,362,056, assigned to Luxim Corporation of Sunnyvale, Calif.

Figure 2E:
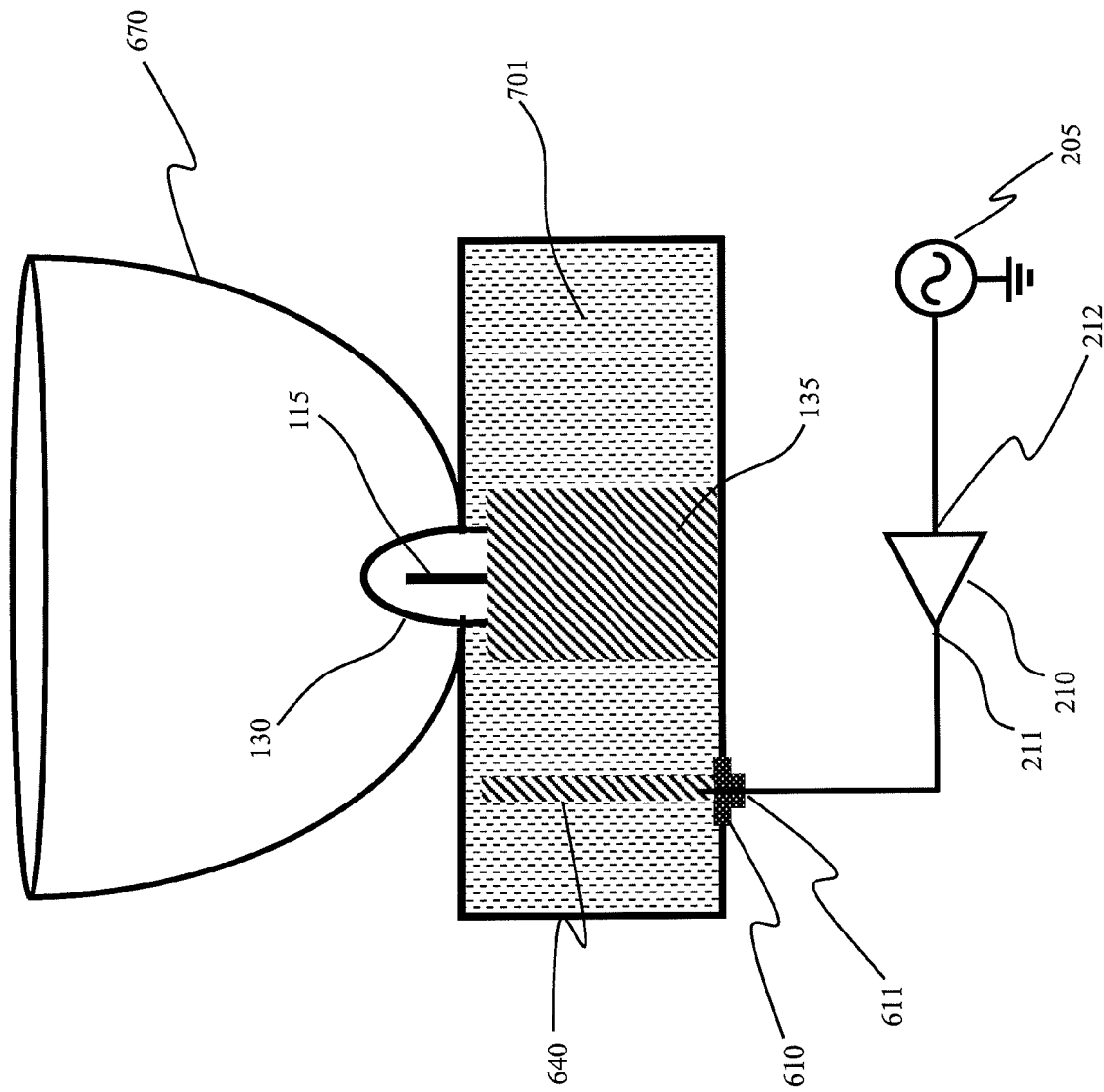
FIG. 2E is a simplified drawing of a dielectric waveguide/resonator electrodeless plasma lamp.

FIG. 2E is a perspective view of an electrodeless plasma lamp which consists of a solid dielectric waveguide/resonator 701 coupling RF energy from the RF source 205 to a gas filled vessel 130. A substantial portion of the arc of the bulb 115 is surrounded by the dielectric waveguide/resonator. A probe 640 couples the RF energy into the dielectric resonator. Other examples of plasma lamp devices are described in "Electrodeless Lamps with Externally-Grounded Probes and Improved Bulb Assemblies," U.S. Patent Application No. 20090322240A1; U.S. Pat. No. 7,291,985; and U.S. Pat. No. 7,362,056.

Figure 3A:
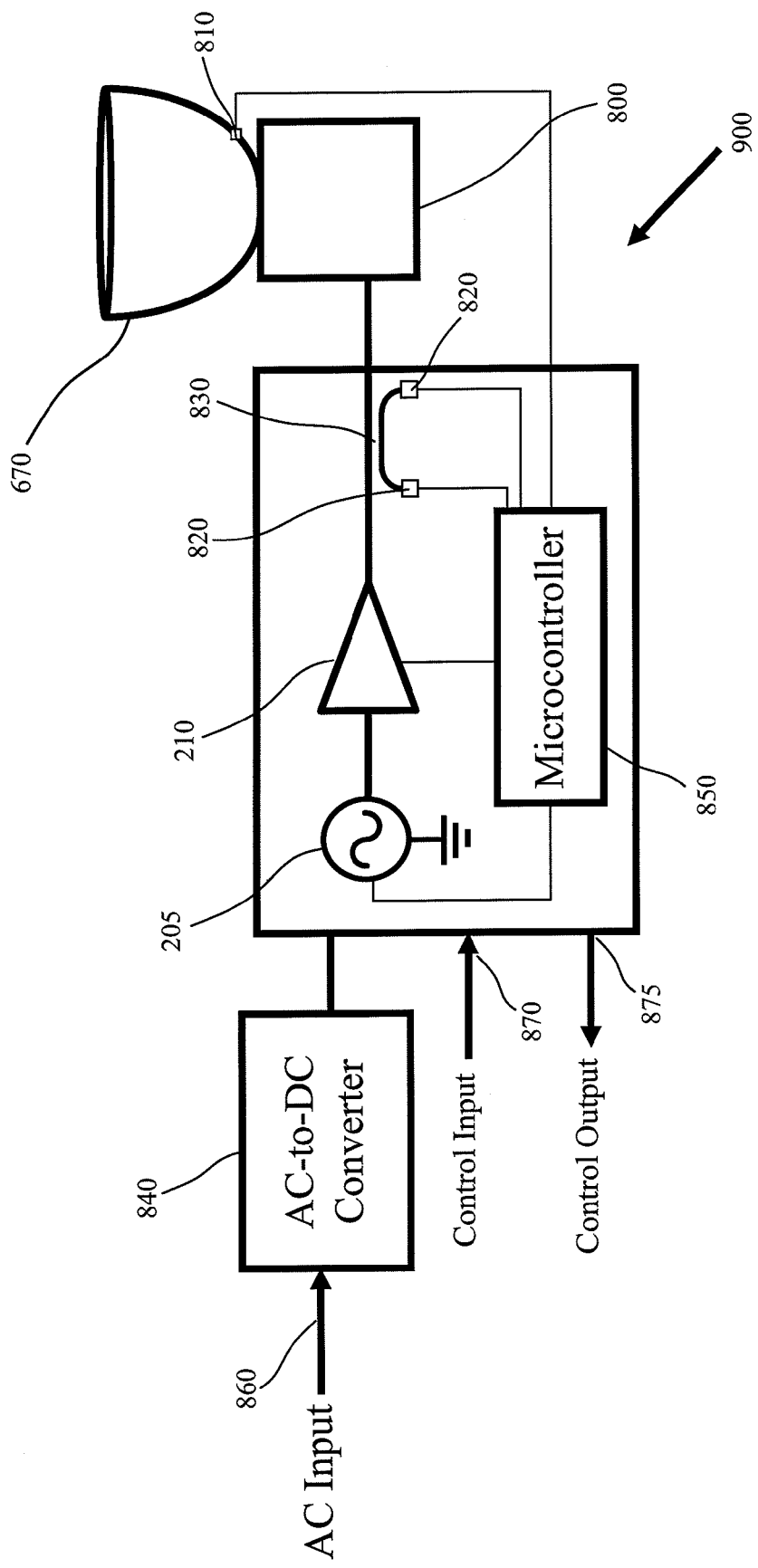
FIG. 3A is a simplified block diagram of an electrodeless plasma lamp showing the RF driver with a control input and an AC-to-DC converter.

FIG. 3A is a simplified block diagram of an electrodeless plasma lamp 800 showing the RF driver 900 with a control input 870, a control output 875, and an AC-to-DC converter 840 with an AC input 860. The RF driver, among other components, includes an RF oscillator 205, one or more amplifiers 210, a microcontroller 850, an RF coupler 830, and RF power detectors 820. The electrodeless plasma lamp has a reflector 670 and a photodetector 810 to measure the output electromagnetic radiation from the lamp and provide feedback to microcontroller/RF driver. The microcontroller can adjust the frequency and the power of the RF oscillator as well as the bias voltages to the RF oscillator and the amplifier(s) to adjust the RF power to the electrodeless plasma lamp. The input power level to lamp as well as the reflected power from the lamp can be measured by the coupler 830 and the RF power detectors 820. Using feedback from the RF power detectors 820 and/or photodetector 810 the microcontroller can control the RF oscillator and/or amplifier to achieve a constant output from the lamp or vary the output of the lamp depending on the desired parameters. The microcontroller can vary the RF output power to the lamp by pulse-width modulation of the RF source. The control input 870 and control output 875 to the RF driver can be through standard interfaces such as RS232 or USB, or it can be through powerline or wireless such as Zigbee.

Figure 3B:
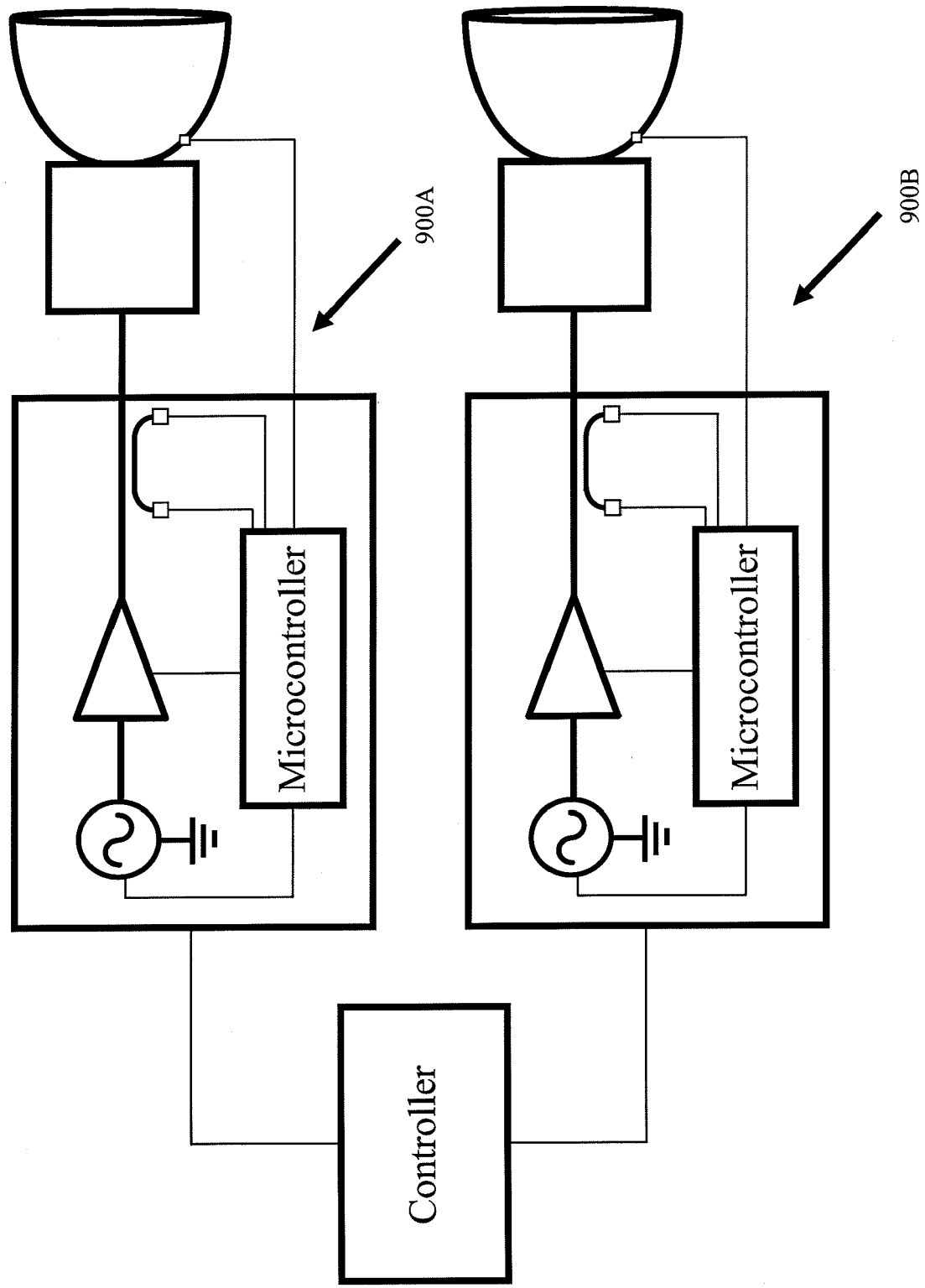
FIG. 3B is a simplified block diagram of an array of two electrodeless plasma lamps with each lamp having an independent RF driver and one controller controlling both lamps according to an embodiment of the present invention.

FIG. 3B is a simplified block diagram of one embodiment of the present invention of an array of two electrodeless plasma lamps with each lamp having an independent RF driver 900A and 900B, similar to the RF driver in FIG. 3A, and one controller controlling both lamps according to an embodiment of the present invention. The RF power output to each lamp can be varied independently so, depending on the separation between the lamps, and the RF power to each lamp, the illumination pattern can be varied to achieve the desired illumination conditions. It is also desirable to use a bulb with a different color temperature for each lamp. For example one lamp may have a bulb with a color temperature of 6000K while the other lamp may have a bulb with a color temperature of 3000K. By combining the lights from these two bulbs and controlling the RF power level to each bulb one can vary the color temperature of the overall source from 3000K to 6000K as well as have the ability to vary the color rendering index. This can also help in improving the overall efficiency of the source in cases where for example a 3000K and 6000K source are more energy efficient than a 4500K source, so one can make a 4500K source with two lower lumens output 3000K and 6000K source combination. Even though an external controller is shown in the figure it is desirable for this array to function without an outside controller, instead using only the microcontrollers inside the RF driver. Also the two RF drivers can communicate with each other using a powerline connection or a wireless connection.

Figure 3C:
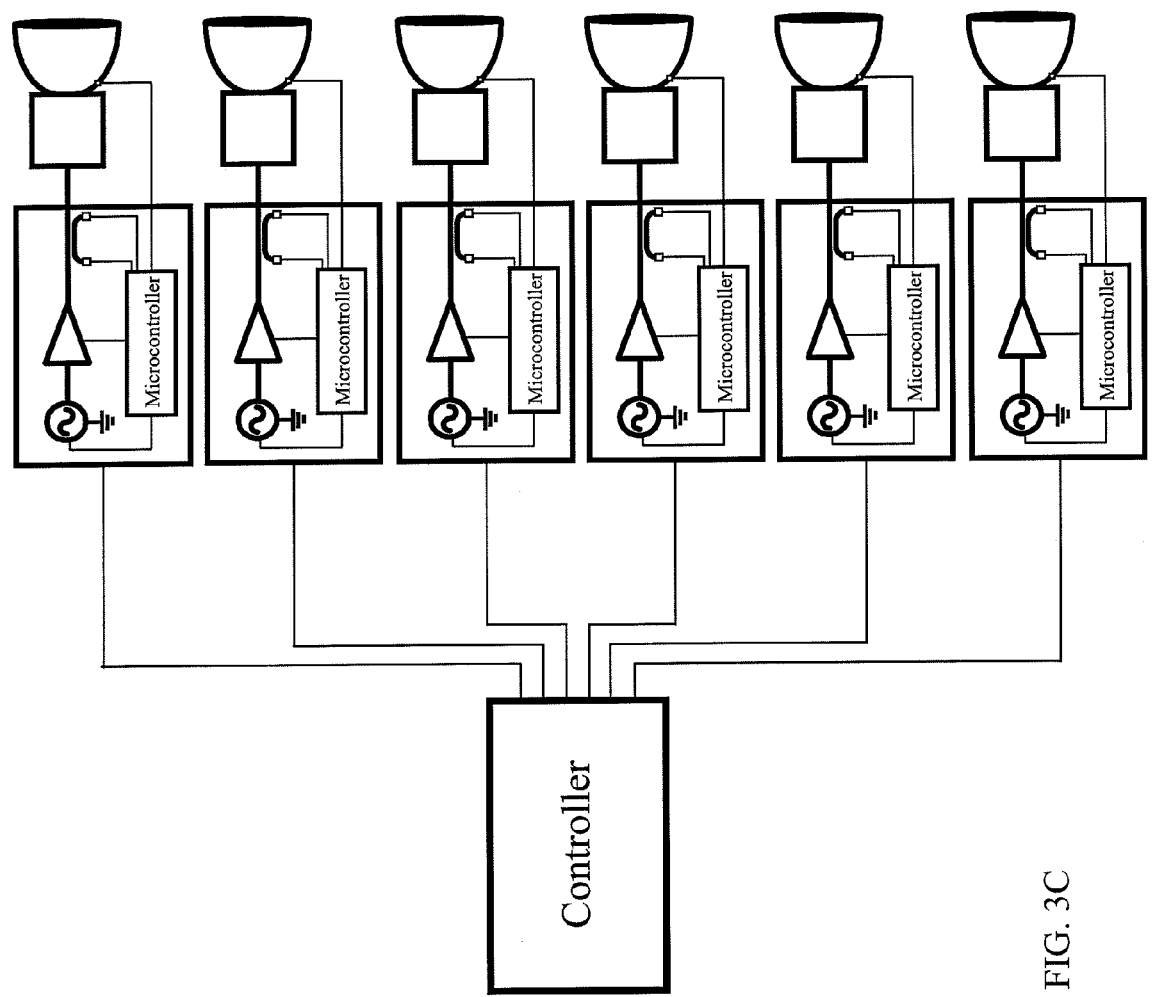
FIG. 3C is a simplified block diagram of an array of electrodeless plasma lamps with each lamp having an independent RF driver and one controller controlling all lamps according to an embodiment of the present invention.

FIG. 3C is a simplified block diagram of one embodiment of the present invention of an array of electrodeless plasma lamps with each lamp having an independent RF driver, similar to the one in FIG. 3A, and one controller controlling all lamps according to an embodiment of the present invention. In this FIGURE six electrodeless plasma lamps are shown, however, other sized arrays may also be used. The connection between the controller and the RF driver can be through interfaces such as RS232 or USB, or it can be through a powerline or a wireless connection. It is also desirable for the RF driver of the lamps to communicate directly with each other, without the use of a separate controller.

Figure 3D:
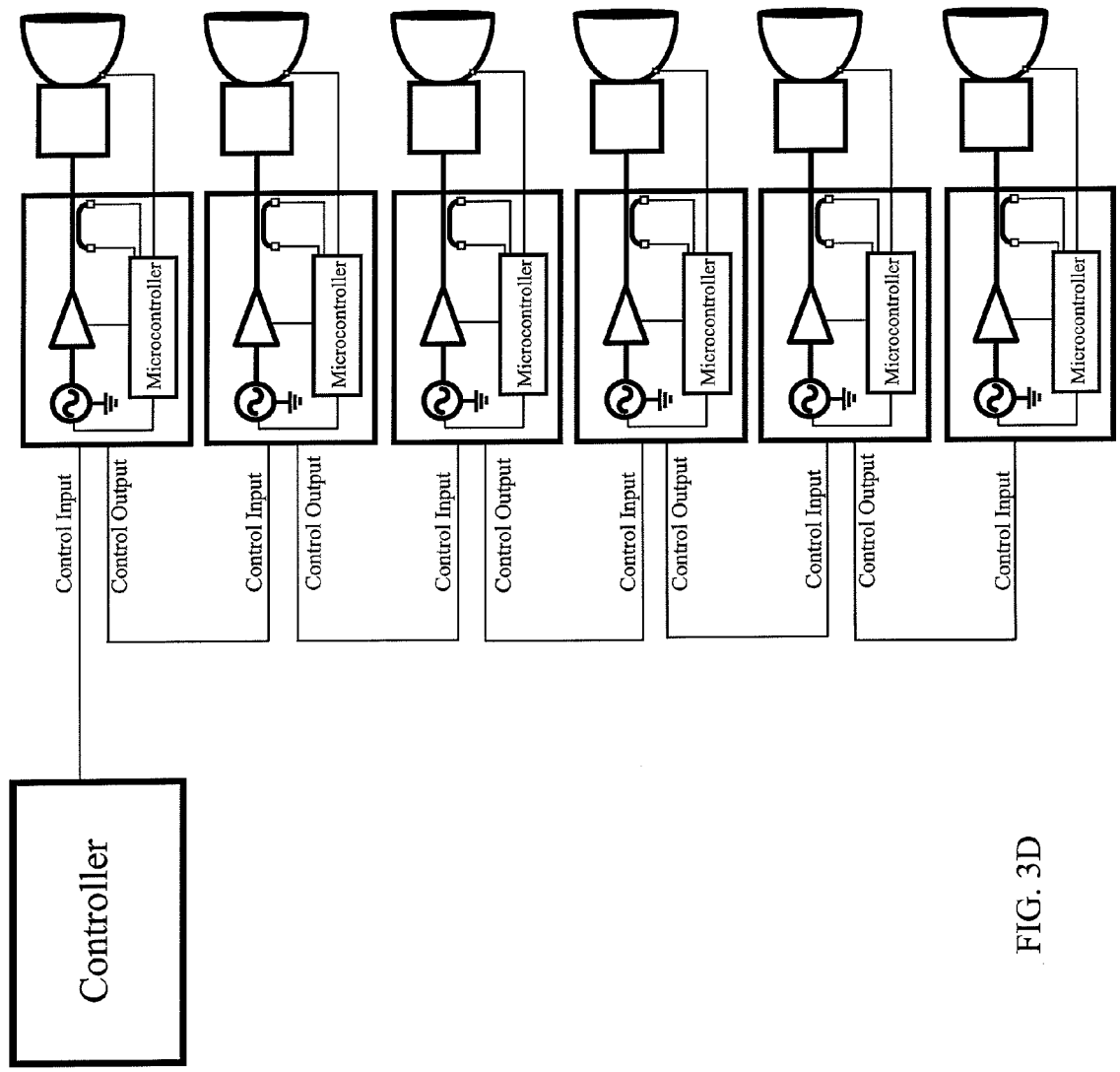
FIG. 3D is a simplified block diagram of an array of electrodeless plasma lamps with each lamp having an independent RF driver and one controller is connected to the first lamp in the array but each subsequent lamp in the array is connected to the previous lamp and to the next lamp in a daisy chain format.

FIG. 3D is a simplified block diagram of one embodiment of the present invention of an array of electrodeless plasma lamps with each lamp having an independent RF driver. One controller is connected to the first lamp in the array, but each subsequent lamp in the array is connected to the previous lamp and to the next lamp, in a daisy chain format. The connection between the controller and the RF driver can be through interfaces such as RS232 or USB, or it can be through a powerline or a wireless connection. It is also desirable for the RF driver of the lamps to communicate directly with each other without the use of a separate controller. Instead of a daisy chain, the RF drivers to be connected via a mesh network.

Figure 3E:
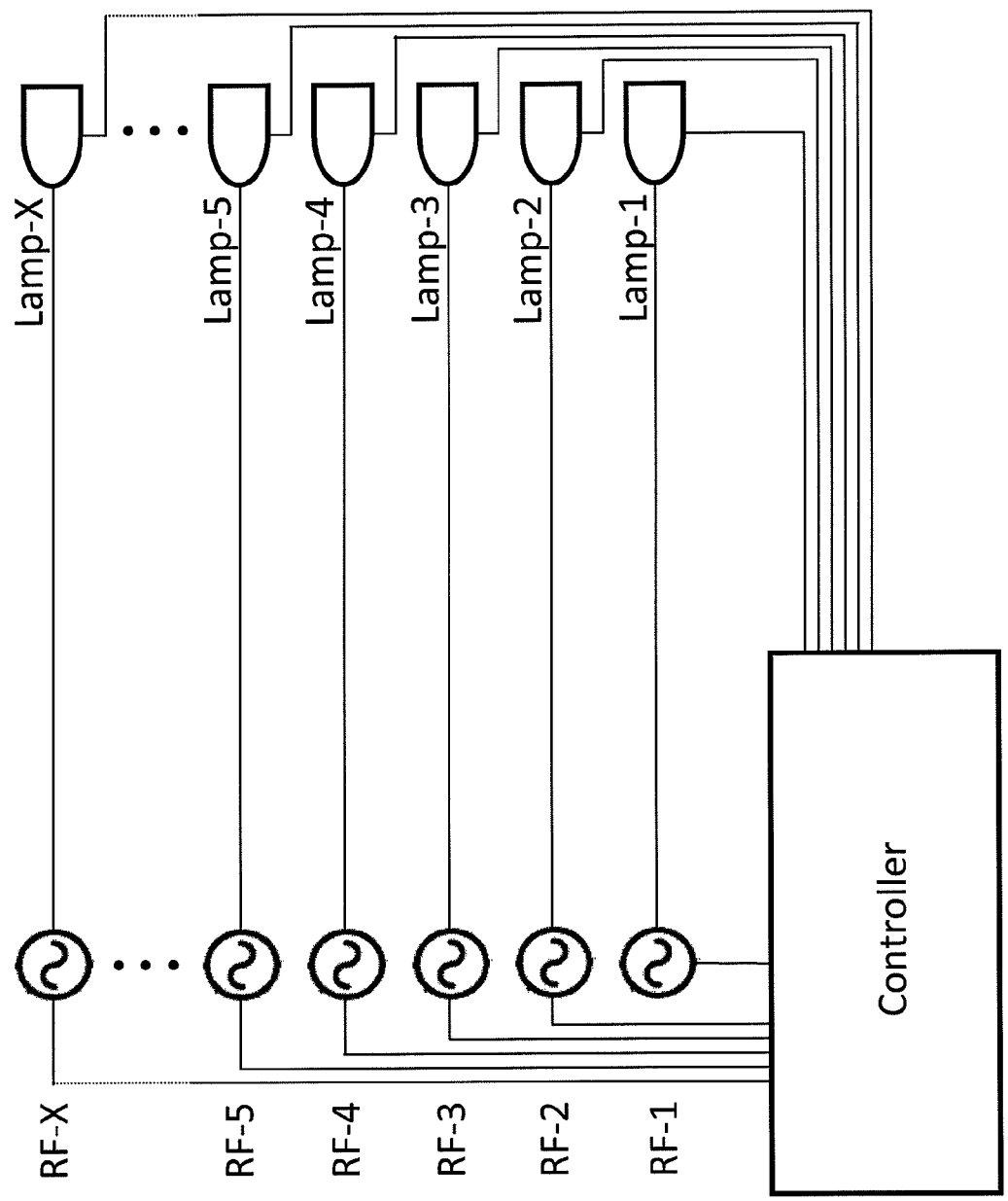
FIG. 3E is a simplified block diagram of an electrical circuit diagram of the array of electrodeless plasma lamps each coupled independently to an RF source according to an embodiment of the present invention.

FIG. 3E is a simplified block diagram of an electrical circuit of the array apparatus of one embodiment of the present invention. The array comprises a plurality of electrodeless plasma lamps numbered from 1 to X (where X>1) and arranged in an M by N array configuration. Alternatively it can be arranged in a linear array of 1 by N, where M is the number of lamps arranged along a first axis, while N is the number of lamps arranged along a second axis, usually perpendicular to the first axis. The array comprising a plurality of RF power source numbered from 1 to X. Each RF power source includes an RF output and a controller. The RF output from the RF power source is coupled directly to a plasma lamp within the array. The controller can control the output power of each RF power source independently. A photodetector at each plasma lamp can provide feedback to the controller. The controller adjusts the amount of RF power that is delivered from the RF power source to each lamp, thereby effectively controlling the intensity of the electromagnetic radiation that is emitted from each individual lamp, as well as the distribution of the intensity.

The ability to control the intensity of the emitted electromagnetic radiation from each individual lamp ensures that, if desired, a uniform intensity level can be achieved. Creating a uniform illumination area allows the configuration of the array to be adapted to a wide variety of industrial applications, for example, polymer curing, photoresist curing, annealing, or paint drying. Additionally the array can be used in ink curing applications or in polymer micro-molding applications. Such polymer micro-molding applications include the fabrication of micro-optical systems and or micro-fluidic devices. The array can also be used in applications involving epoxy curing. Such epoxy curing applications include the creation of molds for industrial tools, and encapsulating circuits on a printed circuit board. The array can also be used in UV water treatment systems as well as in rapid thermal processing for semiconductor fabrication applications. One advantage of using an electrodeless plasma lamp array in these applications, is that the lamps within the array have a high lumens per watt characteristic. Thus the use of such arrays is more cost effective and efficient than previous arrays.

The array can be configured to emit visible, infrared, or ultraviolet electromagnetic radiation. Any combination of lamps emitting the above types of electromagnetic radiation can be used, thereby creating an array that emits electromagnetic radiation of differing wavelengths.

Figure 4:
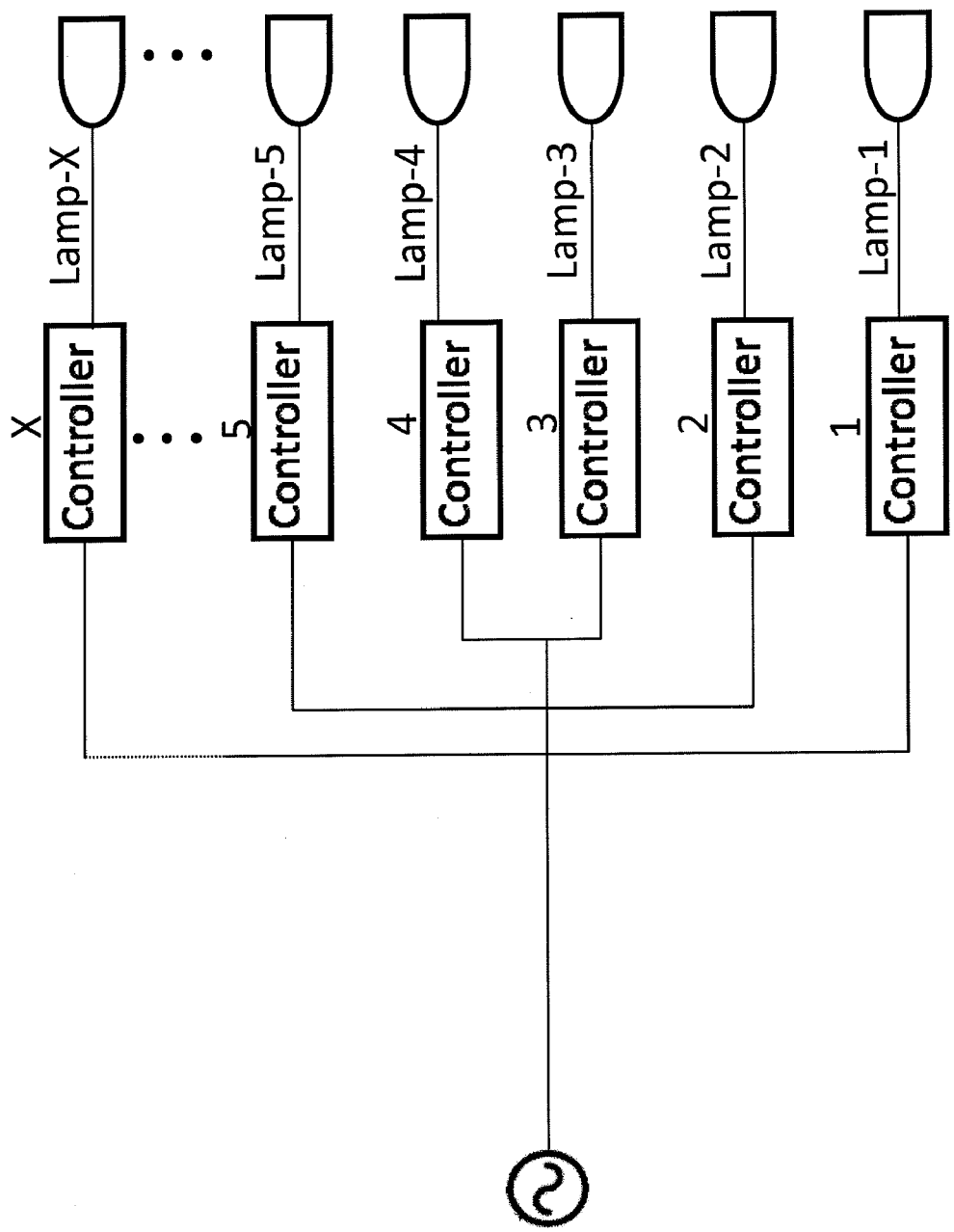
FIG. 4 is a simplified block diagram of an electrical circuit diagram of the array of electrodeless plasma lamps coupled to a single RF source according to an embodiment of the present invention.

FIG. 4 is a simplified block diagram of an electrical circuit of the array apparatus of another embodiment of the present invention. As with the previous embodiment, the array comprises a plurality of electrodeless plasma lamps from 1 to X (where X>1) arranged in an M by N array configuration, or alternatively in a linear array of 1 by N. In this embodiment a single RF power source powers the entire array. The RF power source includes an RF output that is coupled directly to a plurality of controllers numbered from 1 to X (where X>1). The controllers are coupled directly to each individual plasma lamp through a feedback configuration. The feedback configuration allows the controller to determine the amount of RF power that is being delivered to the lamp. The controller adjusts the power that is delivered from the single RF source to the lamp, thereby controlling the intensity of the emitted electromagnetic radiation. As discussed previously such control allows for the tailoring of the array into various applications.

Figure 5:
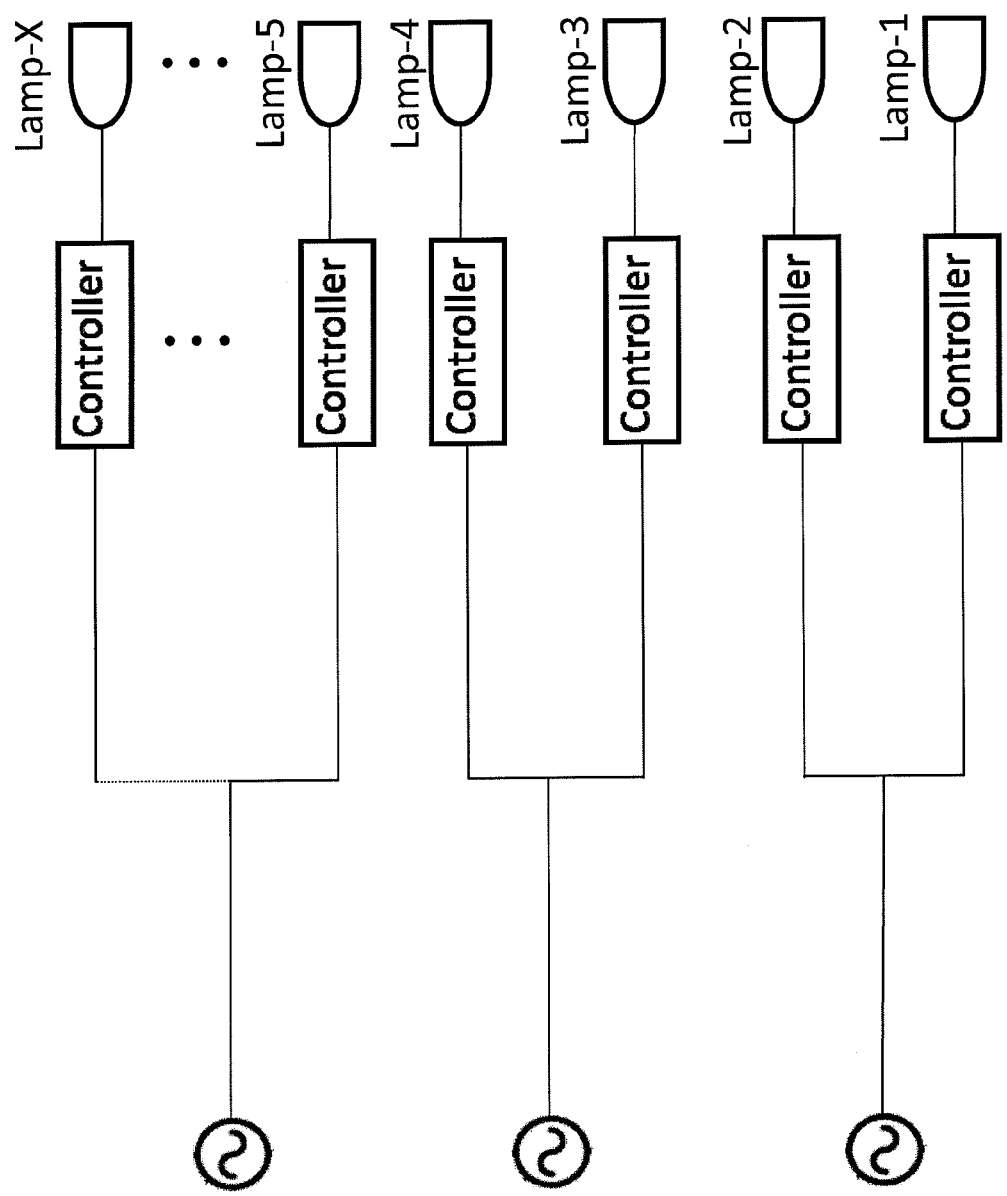
FIG. 5 is a simplified block diagram of an electrical circuit diagram of the array of electrodeless plasma lamps, with each RF source powering at least two electrodeless plasma lamps according to an embodiment of the present invention.

FIG. 5 is a simplified block diagram of an electrical circuit of the array apparatus of another embodiment of the present invention. The array includes a plurality of electrodeless plasma lamps numbered from 1 to X arranged in an M by N array configuration. The array comprising multiple RF power sources. Each RF power source includes an RF output element. Each RF power source is used to power multiple lamps within the array. The RF output element is coupled directly to multiple controllers, corresponding to each lamp that the RF power source is delivering power to. The number of controller ranges from 1 to X, as with the number of lamps in the array. As with the previous embodiment, the controller is coupled to each lamp through a feedback loop. The controllers act to adjust the amount of power that is delivered from each RF power source to each individual lamp in the array, thereby controlling the intensity of the emitted electromagnetic radiation. As discussed previously such control allows for the tailoring of the array into various applications.

In an alternate embodiment of the present invention, each electrodeless plasma lamp within the array includes an individual heat exchanger. The heat exchanger can be provided through any suitable mechanism to draw heat away from the lamp and the RF driver. The heat exchanger allows for the more effective dissipation of thermal energy away from the lamp and the RF driver, thereby ensuring longer device lifetimes and increases reliability.

Figure 6:
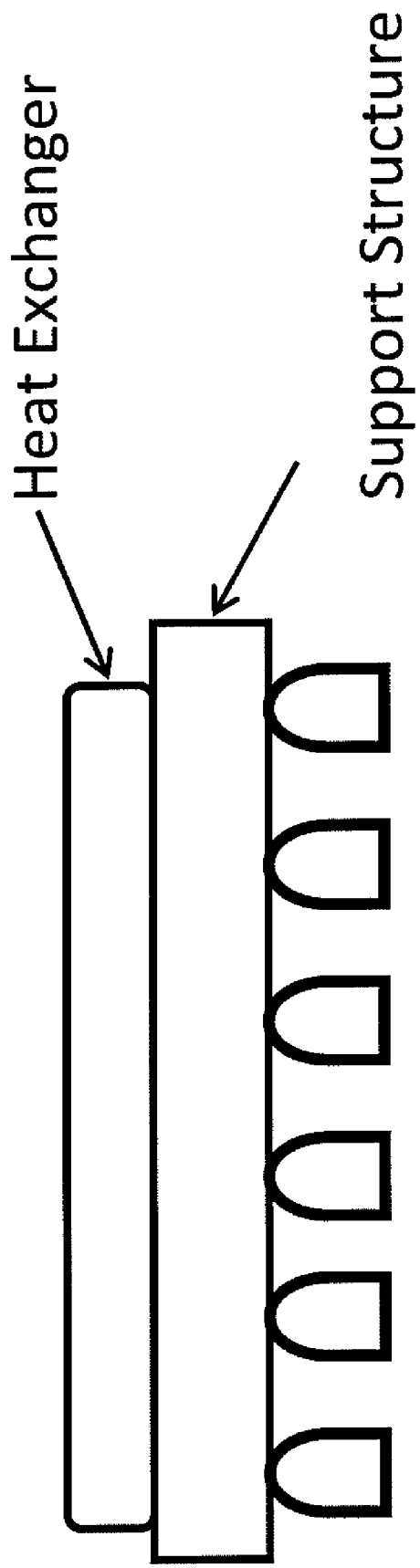
FIG. 6 is a simplified perspective view of an electrodeless plasma lamp array that incorporates at least one heat exchanger into the support structure according to an embodiment of the present invention.

FIG. 6 is a simplified perspective view of an array system of the present invention that includes a heat exchanger. The system includes a plurality of electrodeless plasma lamps. The plurality of lamps are supported by a frame which is thermally conductive. The lamps can be coupled to the frame through any suitable means, for example, welding or bolting, so long as the heat conducted through RF output coupling-element is connected to the support frame to transfer heat to the support frame. The frame can be made of any thermally conductive material strong enough to support such array. The lamps can either be powered by a single RF source or by multiple RF sources. The entire array can be positioned in any manner above any medium which requires exposure to light. Such mediums can include water for UV water treatment, photoresist, or any other medium that requires curing. The array can also be positioned on top of a pole, for street lighting, stadium lighting, or other application that requires large amounts of light. By being thermally conductive, the heat is transferred from the lamps to the support structure. The support structure then transfers the heat to the surrounding environment thereby efficiently transferring the heat generated by the lamps.

A heat exchanger is incorporated into the support structure to further improve the heat transfer characteristics of the array. A heat exchanger, or a series of heat exchangers, may be incorporated within the rigid support structure, or disposed on the opposite, back, or side of the support structure. The heat exchanger serves to further conduct heat out of the support structure, thereby improving the overall heat transfer characteristics of the array. Various heat exchangers can be used, including a shell and tube heat exchanger similar to that used in many common air conditioners. Such heat exchanger uses the vapor compression refrigeration cycle to pull heat away from the support structure. In an alternate embodiment the heat exchanger of the support structure is combined with lamps in an array, in which each lamp in the array has an individual heat exchanger. By incorporating a heat exchanger within the support structure in combination with heat exchangers on each individual lamp, the thermal energy dissipation characteristics of the array is increased.

Figure 7:
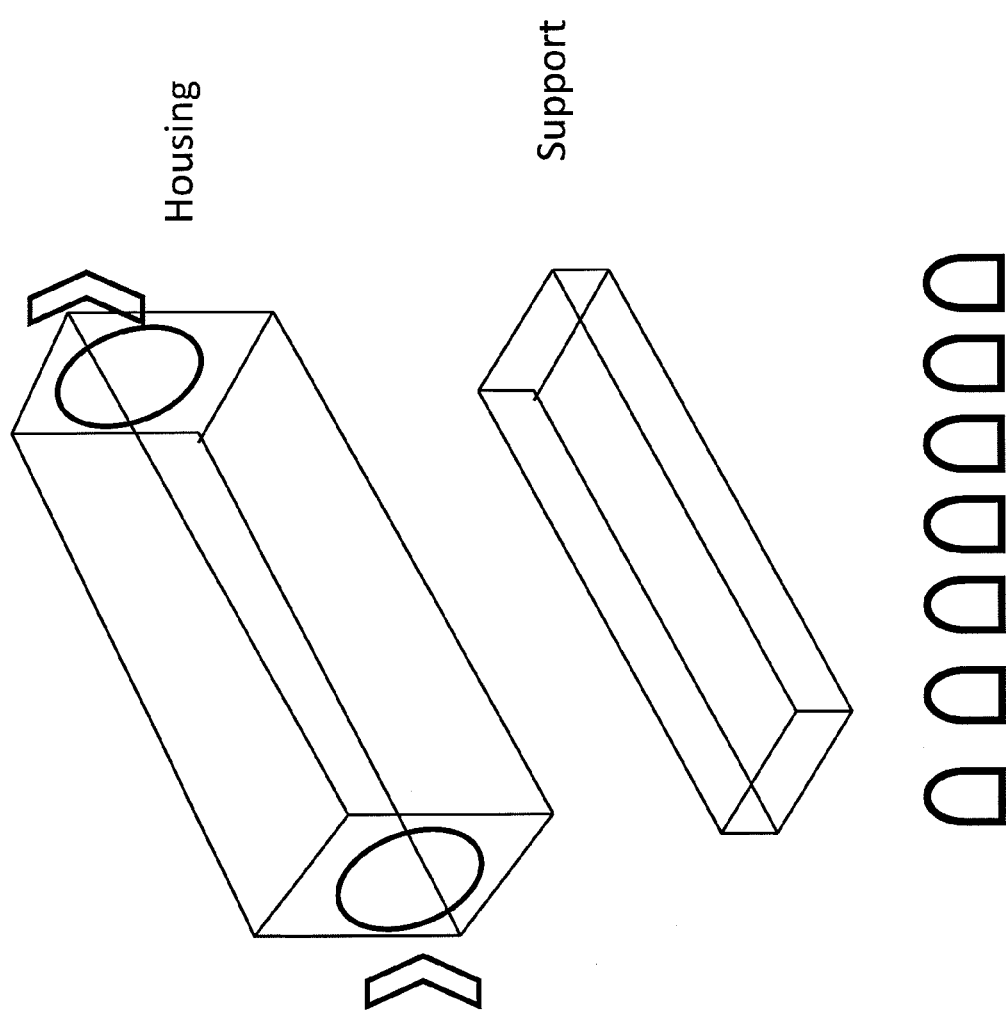
FIG. 7 is a simplified exploded perspective view of an electrodeless plasma lamp array that incorporates a housing structure that allows for the concentrated flow of air through the array assembly according to an embodiment of the present invention.

FIG. 7 is an exploded perspective view of an alternate embodiment of the present invention that incorporates a housing structure with air flow to help transfer the heat away from the support structure. In the present embodiment as with previous embodiments, the array includes electrodeless plasma lamps mounted onto a thermally conductive rigid support structure. A housing structure encompasses the entire support structure and the side of the outer lamps of the array, in a manner such that the bottoms of the lamps are not covered. The housing structure includes openings on opposing walls of the structure to provide a tunnel through which a sufficiently strong air flow is introduced through the array. The openings can be sized to generate the greatest amount of air flow within the array. The air flow can be convective, or assisted by fans. As the air travels across the supporting structure and the lamps, the air absorbs the heat generated by the lamps, thereby effectively improving the heat transfer characteristics of the array.

In yet another embodiment of the present invention, the housing structure with air flow through design of the previous embodiment is combined with a heat exchanger to provide further improved heat transfer characteristics. The assembly, as with previous embodiments, includes lamps attached to a support structure that is thermally conductive. At least one heat exchanger is either incorporated within the actual support structure, or placed on the side of the support structure, preferably opposing the side to which the lamps are attached. The housing structure of the previous embodiment encompasses the heat exchanger, the support structure, and the outer lamps of the array in a manner such that the bottoms of the lamps are not covered. The support structure can also include fins, to provide a larger surface area acting as a heat sink within the assembly. The housing structure contains openings on opposing walls of the structure that provides a means by which an air flow is introduced through the array. In doing so, air is flowed not only across the lamps, but also the support structure and the heat exchanger such that heat is dissipated from all three components of the assembly. The air flow can be provided through any suitable means, including but not limited to fans.

Figure 8:
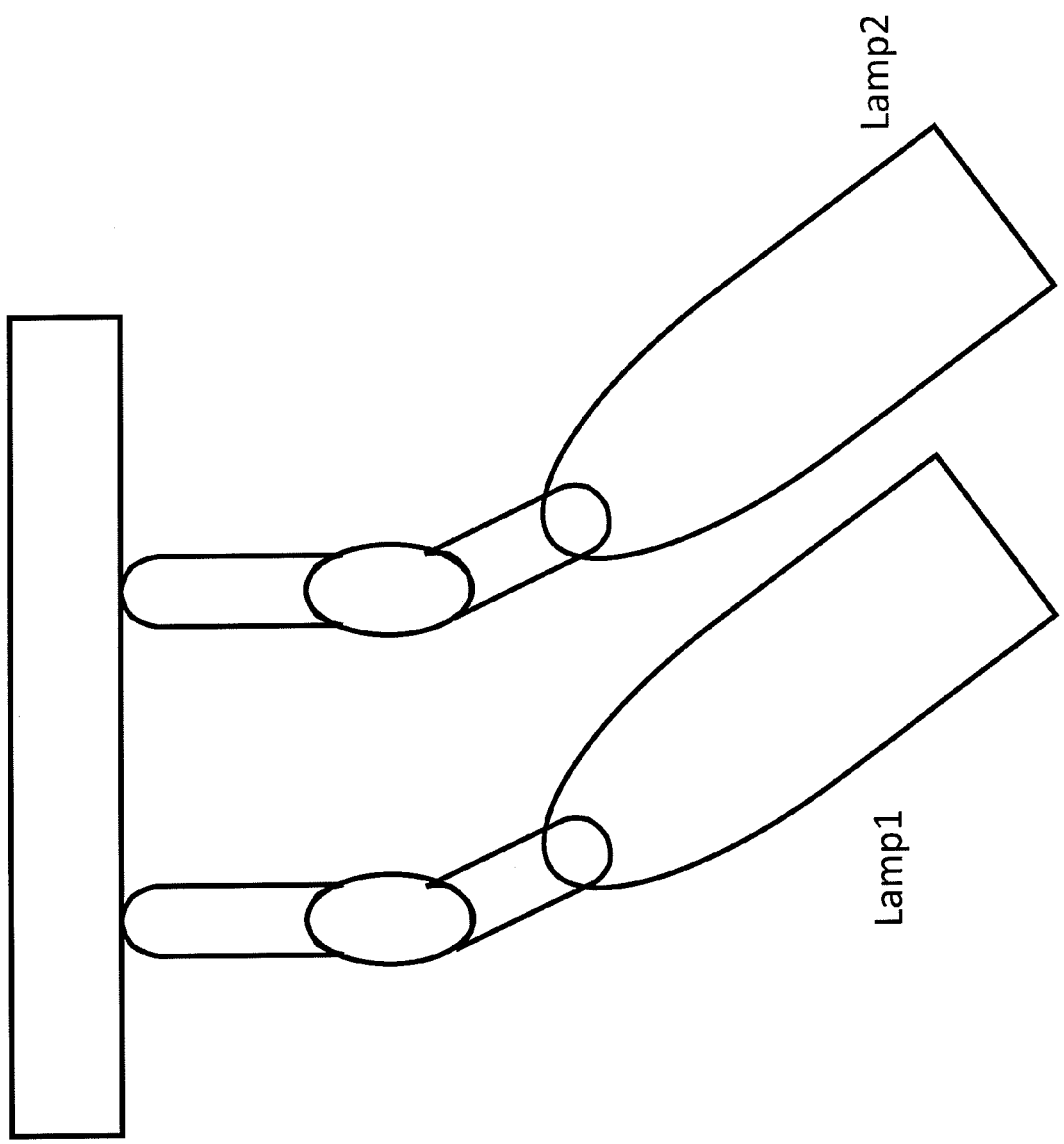
FIG. 8 is a simplified perspective view of a movable lamp coupled to a support structure through a spherical joint, whereby the movement is driven through a servomotor according to an embodiment of the present invention.

As shown in FIG. 8, in another embodiment of the present invention, a movable array of electrodeless plasma lamps is provided through the use of servomotors. Each lamp is coupled to a servomotor through a joint allowing for movement of the lamp in desired directions. The joint, for example, spherical, is thermally conductive and coupled directly to the support structure to ensure that heat is transferred to the support structure, thus allowing for the efficient transfer of heat away from the lamps. The servomotors are thermally isolated from the joint through a resistive barrier that allows contact with, and subsequent control of the joint, with minimal heat transfer to the servomotor. The servomotors are preferably powered through a separate power source not used to generate the plasma within each lamp. The servomotors can be controlled either dependently through a single control system, or independently through multiple control systems. The movable lamp arrays increase the number of applications for such plasma lamp array, such as curing of three dimensional objects, and use in concert or theater lighting systems.

In yet another embodiment, a photodetector is used with the array to control light intensity levels. The photodetector is placed within the illumination field of the array. Its output signal can thus control the intensity of the emitted light. A feedback control system is connected to the photodetector and used to control the amount of RF power delivered to the lamps. In doing so, the control system ensures that the lamps are emitting light at a constant intensity level.

Figure 9:
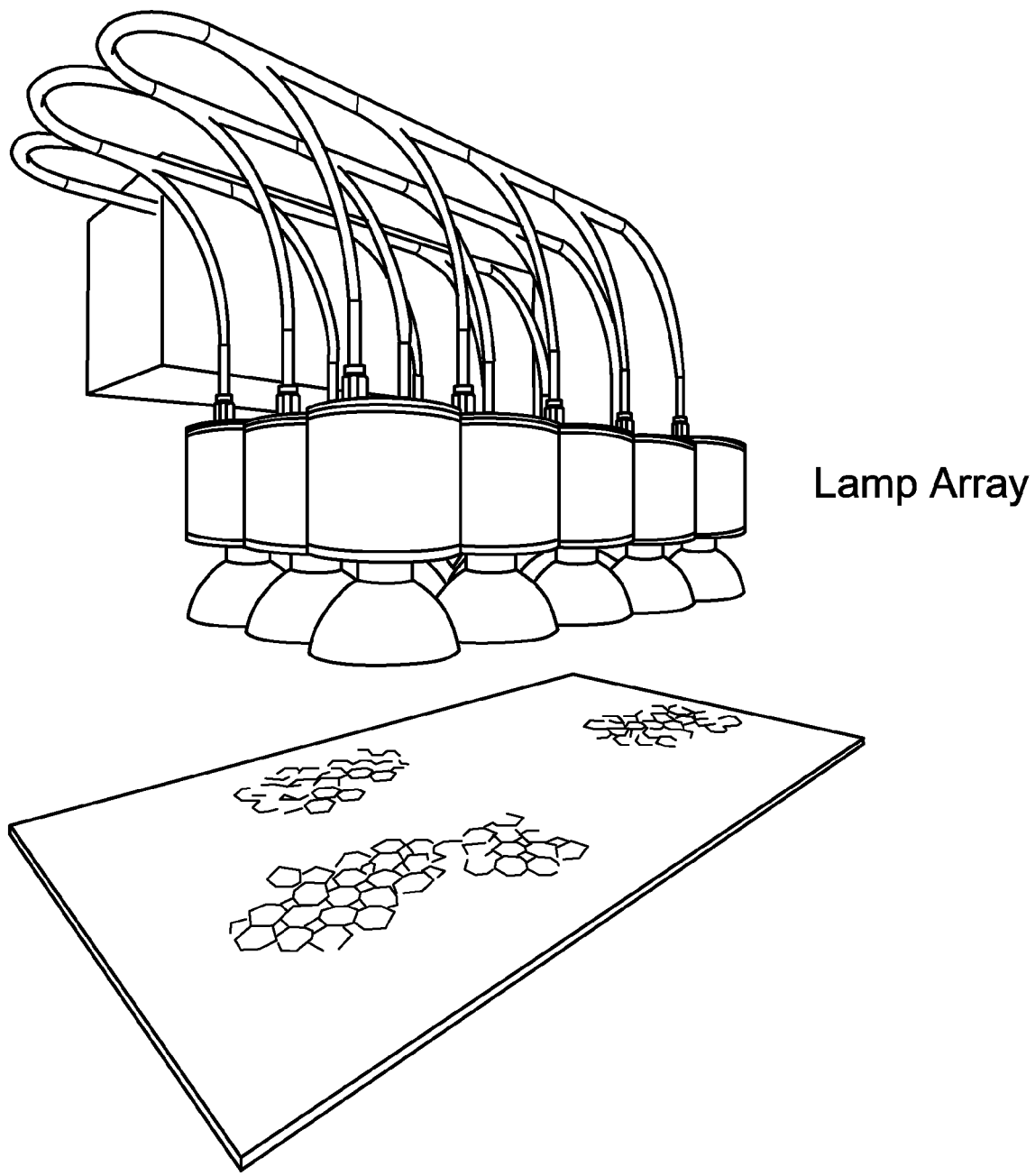
FIG. 9 is a simplified perspective view of a lamp array according to yet an alternative embodiment of the present invention.

FIG. 9 is a simplified perspective view of a lamp array according to yet an alternative embodiment of the present invention. As shown, the lamp array is introducing thermal energy and/or electromagnetic radiation to a medium depicted as a panel. Such mediums can include solar panels subjected to lamination or testing, annealing/curing of an epoxy or photoresist or other similar process, lamination, and UV water treatment, as well as many other processes. In a specific embodiment, the present array can be used in a rapid thermal anneal process such as those used in semiconductor electronics. By using photodetectors and feedback to controller(s), the RF power can be adjusted to each lamp in the array independently, thereby achieving the desired illumination or heating characteristics.

Other examples and details of electrodeless lamps can be found in "Electrodeless Lamps with Externally-Grounded Probes and Improved Bulb Assemblies," in the names of Frederick M. Espiau, Timothy J. Brockett, and Mehran Matloubian, PCT/US2009/048174 filed Jun. 22, 2009, commonly assigned, and hereby incorporated by reference.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An electrodeless plasma lamp array apparatus, the apparatus comprising:
   a plurality of plasma lamp apparatus from 1 to X, where X is greater than 1, arranged in an M by N array configuration, whereupon M is an integer of at least 1, and N is an integer of at least 2, each plasma lamp apparatus comprising a bulb comprising a fill material;
   a plurality of RF power sources respectively coupled to the plurality of plasma lamp apparatus, each of plurality of RF power sources comprising an RF output and a control input; the plurality of RF power sources comprising, respectively, the control inputs from 1 to X; and
   a controller configured to the plurality of RF power sources, and coupled to the control inputs, the controller being configured to selectively adjust RF power from the plurality of RF power sources to cause a change in color temperature by varying the RF power.

2. The apparatus of claim 1 further comprising one or more photodetectors.

3. The apparatus of claim 1 further comprising a heat exchanger and a housing, the housing having a plurality of openings to allow for the pressurized flow of gas through the apparatus.

4. The apparatus of claim 1 further comprising a heat exchanger.

5. The apparatus of claim 1 further comprising a housing the housing having a plurality of openings to allow for the pressurized flow of a gas through the apparatus.

6. The apparatus of claim 1 further comprising a support structure.

7. The apparatus of claim 6 wherein the support structure is configured for stadium lighting.

8. The apparatus of claim 6 wherein the support structure is configured for theater lighting.

9. The apparatus of claim 6 wherein the lamps are coupled to the support structure through a spherical joint with a servomotor.

10. An electrode-less plasma lamp array apparatus, the apparatus comprising:
   a plurality of plasma lamp apparatus from 1 to X, where X is greater than 1, arranged in an M by N array configuration, whereupon M is an integer of at least 1 and N is an integer of at least 2;
   a single RF power source respectively coupled to the plurality of plasma lamp apparatus, the single RF power source comprising an RF output; and
   a plurality of controllers from 1 to X configured to the single RF power source, the controllers being configured to selectively adjust RF power delivered to each individual plasma lamp apparatus within the array.

11. An electrode-less plasma lamp array apparatus, the apparatus comprising:
   a plurality of plasma lamp apparatus from 1 to X, where X is greater than 1, arranged in an M by N array configuration, where M is an integer of at least 1 and N is an integer of at least 2;
   a plurality of RF power sources respectively coupled to the plurality of plasma lamp apparatus, each of plurality of RF power sources comprising an RF output; and
   a plurality of controllers from 1 to X configured respectively to the plurality of RF sources, each of the controllers being configured to selectively adjust RF power delivered to each plasma lamp apparatus.

12. The apparatus of claim 11 wherein the plurality of controllers are in communication using a daisy chain or a meshed network.

13. The apparatus of claim 11 wherein the plurality of controllers are in communication using any combination of a powerline network or a wireless network.

14. The apparatus of claim 11 wherein the array is used for rapid thermal processing.

15. The apparatus of claim 11 wherein at least one plasma lamp within the array is configured to emit visible electromagnetic radiation, at least one other plasma lamp within the array is configured to emit infrared electromagnetic radiation and at least one other plasma lamp within the array is configured to emit ultraviolet electromagnetic radiation.

16. The apparatus of claim 6, wherein the support structure includes fins to increase the surface area of the support structure acting as a heat sink.

* * * * *